United States Patent

[11] 3,593,142

[72] Inventors Stanley L. Freeny
Middletown;
Bernard G. King, Rumson; Thomas J. Pedersen, Lincroft, all of, N.J.
[21] Appl. No. 878,340
[22] Filed Nov. 20, 1969
[45] Patented July 13, 1971
[73] Assignee Bell Telephone Laboratories, Incorporated
Murray Hill, N.J.

[54] DIGITAL TRANSMISSION SYSTEM EMPLOYING BAND LIMITED ANALOG MEDIUM WITH ADAPTIVE EQUALIZER AT TRANSMITTER
4 Claims, 4 Drawing Figs.

[52] U.S. Cl. .......... 325/42, 333/18
[51] Int. Cl. .......... H04b 1/00
[50] Field of Search .......... 179/15 AE, 15 BL; 325/38, 41, 42, 43, 44, 49, 50, 63, 64; 333/17, 18

[56] References Cited
UNITED STATES PATENTS
3,456,191 7/1969 Rodenburg et al. .......... 325/42

*Primary Examiner*—Robert L. Griffin
*Assistant Examiner*—Albert J. Mayer
*Attorneys*—R. J. Guenther and E. W. Adams, Jr.

ABSTRACT: A transmission system for transmitting multilevel digital signals over an analog band limited transmission medium. The digital signals to be transmitted are predistorted by a transversal preequalizer located at the transmitter which operates under the control of equalizer correction signals derived from the output of an analog-to-digital encoder at the receiver; which signals are sent from the receiver to the transmitter over a relatively low-speed signaling or reverse channel. After such predistortion the multilevel signals are transmitted using vestigial sideband techniques so that digital apparatus is required only in the transmitter and receiver with none required at intermediate points.

INVENTORS S. L. FREENY
B. G. KING
T. J. PEDERSEN
BY Leonard A. Arnold
ATTORNEY

DIGITAL TRANSMISSION SYSTEM EMPLOYING BAND LIMITED ANALOG MEDIUM WITH ADAPTIVE EQUALIZER AT TRANSMITTER

BACKGROUND OF THE INVENTION

This invention relates to digital transmission systems and, more particularly, to a multilevel digital transmission system for transmitting such signals over a band limited analog transmission system using digital equipment only at the transmitting and receiving terminals. Heretofore such transmission systems have required the use of elaborate equalizers at the receiving terminal, and those equalizers have had to be of the analog type in order to minimize cost. An equalizer for use in such a system is disclosed by R. W. Lucky in an article in vol. 45 of the Bell System Technical Journal "Techniques for Adaptive Equalization of Digital Communications Systems," at pages 255—286. The Lucky equalizer is essentially an analog device which is relatively slow in operation and has been used only at the receiver after the demodulation process has been accomplished. Because of the potential cost savings inherent in the use of digital equipment throughout transmitting and receiving terminals, it would be desirable to employ a digital equalizer at the receiver in place of such an analog equalizer. However, such an equalizer would require an essentially infinite encoder in order to avoid error due to quantization inherent in any digital apparatus. As a practical matter, this would mean that the number of bits employed in the encoding apparatus associated with such an equalizer would have to be substantially greater than the number of bits in the transmitted signal. Such an equalizer would inherently be very expensive.

It has been discovered that the bit capacity of a digital equalizer need not exceed the number of bits of the transmitted signal if, in accordance with this invention, the equalizer is used at the transmitter as a predistortion device. The price that must be paid for such a reduction in cost is the cost of a reverse channel from the receiver to the transmitter to transmit control information from the encoder to the equalizer. Overall apparatus embodying this invention effects a substantial cost reduction despite the need for a reverse channel.

SUMMARY OF THE INVENTION

A transmission system for transmitting multilevel digital signals over an analog band limited transmission medium. The digital signals to be transmitted are predistorted by a transversal preequalizer located at the transmitter which operates under the control of equalizer correction signals derived from the output of an analog to digital encoder at the receiver; which signals are sent from the receiver to the transmitter over a relatively low speed signaling or reverse channel. After such predistortion the multilevel signals are transmitted using vestigial sideband techniques so that digital apparatus is required only in the transmitter and receiver with none required at intermediate points. Because the equalizer is located at the transmitter the equalizer may employ digital circuits exclusively, resulting in greater economy.

DETAILED DESCRIPTION

Figure 1:
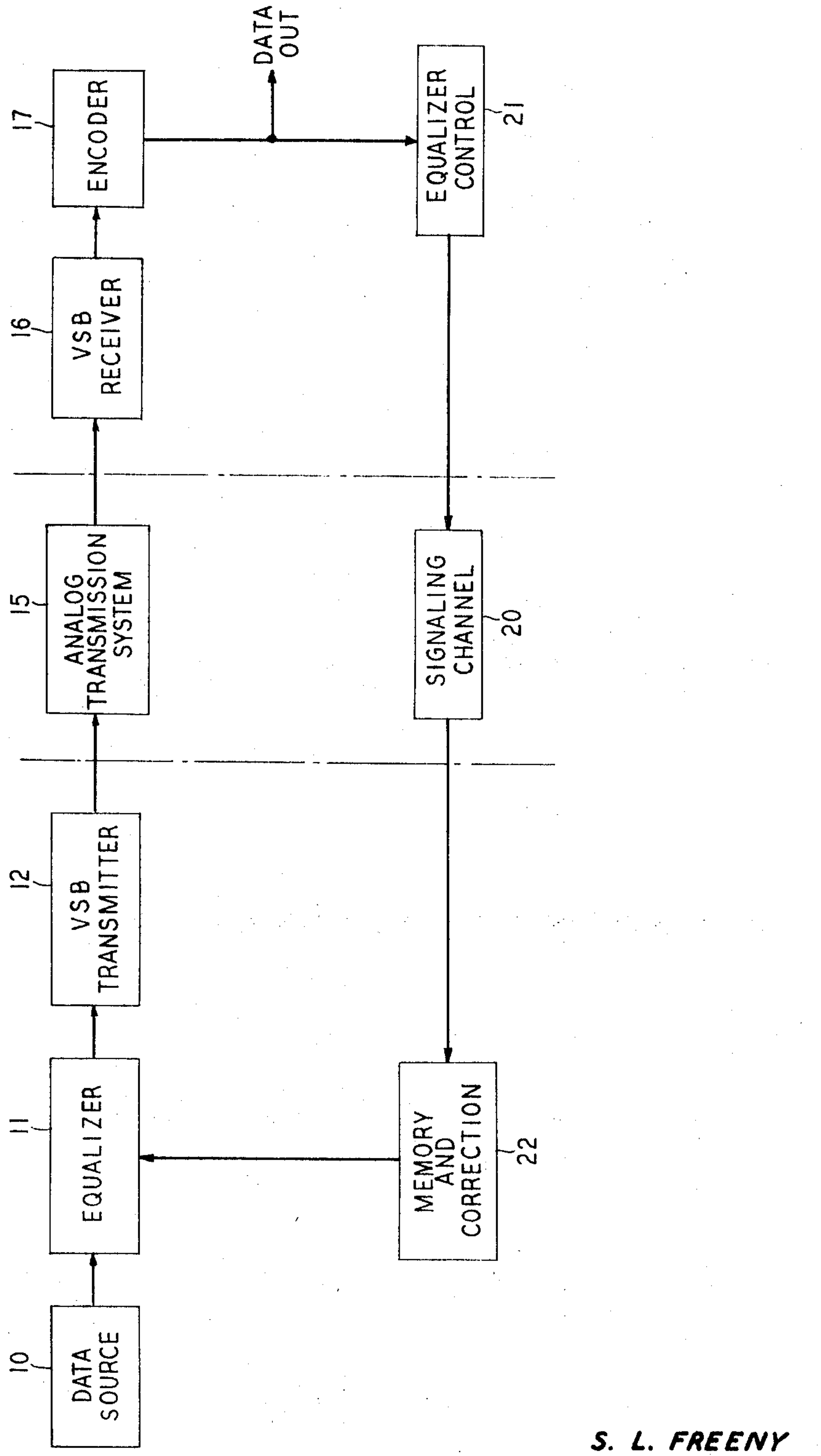
FIG. 1 is a block diagram of a transmission system embodying the invention.

A digital input signal from source 10 is applied to an equalizer 11, as shown in FIG. 1, from which it emerges as a deliberately distorted multilevel digital signal. This signal is then applied to a vestigial sideband transmitter 12, then transmitted over the analog facility 15 to a vestigial sideband receiver 16 whose output is an analog signal whose amplitude, when encoded by encoder 17 yields a data output signal substantially identical to the data input signal from source 10. In accordance with this invention the equalizer 11 is located at the transmitting terminal and is controlled by signals transmitted from the receiving terminal to the transmitting terminal over a signaling channel 20. At the receiving terminal equalizer control apparatus 21 derives necessary equalizer control signals from the output of encoder 17 and these signals, after being operated on by a memory and correction circuit 22, located at the transmitter serve to adjust the equalizer so that the signals from source 10 are predistorted in such a manner as to overcome the distortion introduced by the analog transmission system 15.

In a preferred embodiment of the invention, two separate channels are formed at the transmitter 12 by dividing the band of the transmission system 15 with a pilot signal which serves as a frequency source from which pulse timing, carrier, and line pilot sine waves are obtained. The vestigial sideband signals are placed in these channels at the transmitter and reduced to base band at the receiver by the techniques of amplitude modulation and filtering. Nyquist filters at the transmitter and receiver in such a preferred embodiment would be employed to shape the respective signals on each side of the pilot signal so that the recovered signal is a train of Nyquist pulses which have zero crossings at each known central sampling instant. For example, the lower vestigial sideband channel would comprise a filter to first remove all signal energy above a predetermined frequency related to the pilot signal. The output of such a filter would then be applied to a double balanced modulator which would translate this signal from base band to a symmetrical position around the carrier signal. The modulated signal is then band limited and shaped by a vestigial sideband filter, after which it is amplified by the transmitting amplifier and sent out on the line. At the receiver the modulated signal and tone are applied to a dual output receiving amplifier, one output of which contains a band-pass filter at the pilot frequency to extract the pilot and derive the carrier signal so that the input signal may be demodulated to obtain the data signals.

Figure 2:
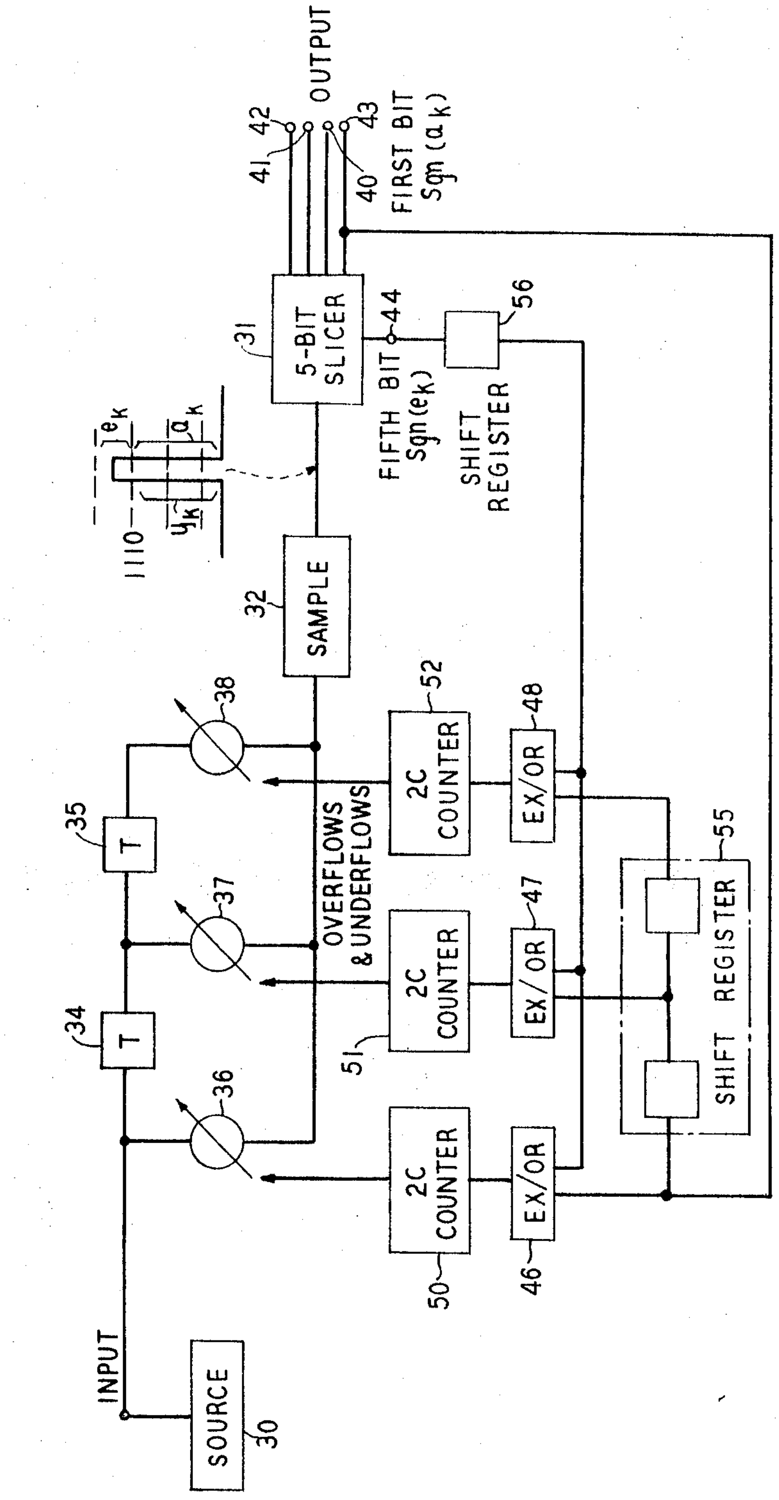
FIG. 2 PRIOR ART
FIG. 2 is a schematic block diagram of a prior art adaptive equalizer for use at the receiver of a transmission system.

Before entering into a detailed description of an equalizer which may be employed in a transmission system embodying this invention, a brief background discussion of a three-tap prior art adaptive equalizer for use at a receiver will be undertaken in order to provide background information. A three-tap adaptive equalizer using the principles disclosed by Lucky at page 268 of the above-mentioned article in the Bell System Technical Journal is shown in FIG. 2. The incoming signals from source 30 are distorted pulse signals received from the transmission system and the function of the adaptive equalizer is to generate a code output signal at the output of slicer circuit 31 representative of the input signal. The sampler 32 and slicer 31, which are connected to the output of a three-tap delay line, comprising two delay elements 34 and 35 and three adjustable gain elements 36, 37 and 38, function to regenerate the data signal as it appears at the output of the delay line.

The slicer circuit 31 generates four parallel output signals in order to denote the polarity and magnitude of a 16 level signal. The ensemble of signals appearing on terminals 40, 41 and 42 denotes the amplitude, whereas the presence of a pulse on terminal 43 indicates a level of positive polarity and a level of zero on terminal 43 indicates the presence of a signal of negative polarity. These latter signals are denoted sgn $(a_k)$. In addition, in accordance with the disclosure of Lucky, one further output signal is generated at a terminal 44 of slicer 32 and this signal indicates the level of the signal at a sampling instant determinative of whether upon reaching a level decision, the encoder rounded the sample up or down. These error signals are denoted sgn $(e_k)$.

As disclosed by Lucky, the signals present at terminal 44 are correlated with the signal present at terminal 43 by means of exclusive-OR circuits 46, 47 and 48 and counters 50, 51 and 52. Shift register 53 serves to delay one output sgn $(a_k)$ from terminal 43 in order to be able to correlate *n* future and *n* past symbol polarities. More particularly, the signal at terminal 43 is directly applied to summing circuit 46 and is also delayed by one time slot and applied to exclusive-OR circuit 47, and delayed by another time slot and applied to exclusive-OR circuit 48. The outputs of circuits 46, 47 and 48 are applied to counters 50, 51 and 52, respectively. As a result of this arrangement, whenever the gain element 37 is not properly adjusted, the counter 51 will function to either increase or reduce the gain of gain element 37, in order to properly adjust the level of the center point of a pulse transmitted through the equalizer. Similarly, gain elements 36 and 38 will be adjusted to equalize the levels of a pulse signal one sampling instant prior to, and one sampling instant after, respectively, the center point of the pulse.

The apparatus shown in FIG. 2 must be employed at the receiver in order to accomplish equalization. In addition, it is essentially an analog circuit since the signal applied from source 30 is an analog signal. If one were to attempt to use a digital delay element in place of elements 34 or 35, the number of levels which such an element would have to be capable of distinguishing would be at least twice the number of levels in the input signal. Otherwise, an error similar to quantization error would occur which would render the rest of the apparatus essentially useless. Such equipment, capable of distinguishing a substantially greater number of levels than that contained in the input signal, would of necessity be very expensive.

In accordance with this invention a digital equalizer is employed at the transmitting terminal in order to predistort the transmitted signals under the control of a signal transmitted back from equalizer control apparatus located at the receiver.

Figure 3:
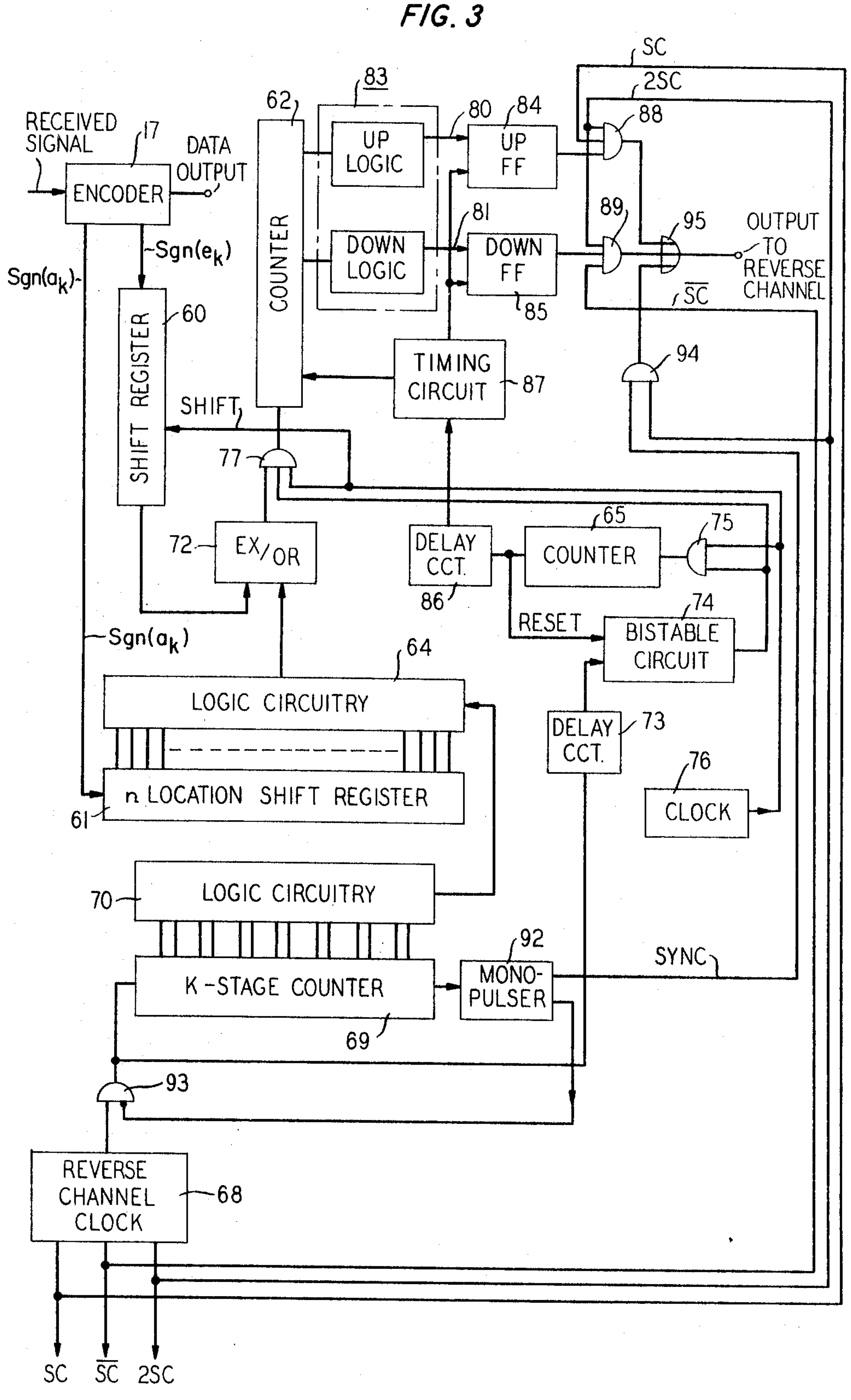
FIG. 3 is a schematic block diagram of the equalizer control apparatus employed at the receiver to generate the signals to be transmitted back to the transmitter by means of the reverse channel in order to properly predistort the transmitted signals.

A block diagram of equalizer control apparatus which may be employed at the receiver of a transmission system embodying this invention is shown in FIG. 3. An encoder 17, corresponding to the sample circuit 32 and slicer circuit 31 shown in FIG. 2 generates the data output signal and also the sgn $(a_k)$ polarity signals and sgn $(e_k)$ error signals. In accordance with this invention, the encoder 17 need only have a bit capacity equal to one greater than that of the transmitted signal. A *n* location digital delay circuit is employed to perform the function of shift register 55 of FIG. 2. Rather than use multiple counters for each location of the delay apparatus, a single counter 62 is time shared among the locations of the shift register 61. Logic circuitry 64 associated with shift register 61 connects an exclusive-OR circuit 72 and counter 62 to successive locations along the shift register so that exclusive-OR circuit 72 and counter 62 serve the function of all the counters and exclusive-OR circuits of FIG. 2. Correlations for each of the *n* locations of shift register 61, corresponding to locations on taps on a delay line, are performed for a fixed interval of time. At the end of this interval, framing information is transmitted by means of the reverse channel to the transmitter.

In somewhat more detail the sequence of operations for determining the setting of a tap is as follows. A pulse from a reverse channel clock source 68 arrives at a *k* stage counter 69 where $k^2=n$ and advances its count by one. The state of the counter 69 is sensed by logic circuitry 70 which controls additional logic circuitry 64 to connect one output of *n* location shift register 61 to the input of an exclusive-OR gate 72. The signal which advanced the stage of counter 69 is also delayed by delay circuit 73 to set a bistable circuit 74 whose output, in turn, enables AND gate 75 at the input of counter 65 so that counter 65 can receive clock pulses occurring at the received data rate from a source of clock pulse 76. The counter 65 proceeds to count to a predetermined number at which time the change of state of the last stage resets bistable circuit 74 so that the clock pulses from source 76 are no longer applied to counter 65. While in its set condition, bistable circuit 74 also enabled AND gate 77 so that the output of exclusive-OR gate 72 could be clocked through AND gate 77 under the control of the clock signals from source 76. The output of AND gate 77 is applied to counter circuit 62 which is advanced each time the output of gate 72 is a "1" but which is not advanced each time the output is "0."

At the end of the interval determined by counter 65, counter 62 contains a predetermined number of individual correlations between the error and symbol polarity bit streams. This sum indicates the degree of misequalization at the particular indexed location of the *n* location digital delay line 61. If this sum is large, there is a strong correlation between a symbol of a given polarity and an error of the same polarity at the location in question, while if the sum is small, there is a strong correlation between a symbol of a given polarity and an error of the opposite polarity at the location in question. If the sum is equal to approximately one-half the count determined by counter 65, there is probably very little error corresponding to the location in question.

In order to utilize the output of counter 62, it is necessary to provide logic circuitry to generate signals for transmission over the reverse channel to adjust the equalizer at the transmitter. If the count is above a first predetermined number, an output appears at terminal 80 of logic circuit 83. If it is below a second predetermined number, a count appears at terminal 81 of logic circuit 83. Logic circuit 83 operates upon the signals to present at the output of counter 62 to enable the apparatus to produce an output signal indicative of the three possibilities, i.e., whether greater than the first predetermined number, less than the second predetermined number, or between the two predetermined numbers.

The output of counter 65 is also applied through a delay circuit 86 to a timing circuit 87 which generates output pulses to cause the output of the logic circuit 83 to be stored in bistable circuits 84 and 85 and also resets counter 62 so that correlations can be performed at the next location determined by register 61.

Clock source 68 generates, in addition to the clock pulses applied to gate 93, three signals denoted SC, $\overline{SC}$ and 2SC. The signals SC and $\overline{SC}$ occur at the clock rate of source 68 while the signal 2SC occurs at twice that rate. These signals are applied to gates 88, 89 and 94 and they are used to generate a double time slot pattern in the reverse channel indicative of the manner in which the equalizer is to be adjusted. For example, when the up logic generates an output, it is desired to transmit the signal 10 while, when the down logic generates an output, it is desired to transmit the signal 01. When the correlations are such that no change is required in the setting of the equalizer, it is desired to transmit the signal 00. Furthermore, the signals transmitted over the reverse channel must contain framing information so that the apparatus at the transmitting terminal is able to determine to which of the locations of the delay line the received signals relate. To accomplish such framing, two consecutive ones, 11, are inserted in the signals transmitted over the reverse channel after the correlation for the last location is obtained.

To generate the up signal, the signals SC and 2SC are applied to two of the inputs of gate 88 so that when a signal is stored in gate 84, gate 88 will generate during the first half of a time slot in the reverse channel, a pulse which is applied through OR gate 95 to the output, upon the occurrence of the positive pulse in the 2SC signal and a positive pulse in the SC signal. In the second half of the time slot, the gate 89 is read out because of the simultaneous occurrence of the positive half-cycle of the $\overline{SC}$ square wave and a second occurring 2SC pulse. Since a zero is stored in bistable circuit 85, no output signal is then produced so that the signal applied to the output terminal through gate 95 is a zero. The resulting two signals occurring in a single time slot on the reverse channel is the signal 10 indicating an up correction.

Similarly, the down correction signal 01 is produced by the enablement of gates 88 and 89 by the 2SC signal but gate 88 produces no output signal in the first half time slot because there is no enabling signal from bistable circuit 84. In the second half of the time slot, the presence of a pulse stored in bistable circuit 85 produces a one. Neither gate 88 nor 89 will produce an output signal if neither an up nor a down correction is needed so that pulse signal 00 would be transmitted.

Finally, in order to synchronize these varying signals so that the transmitter is able to ascertain the nature of the signal transmitted, the synchronization signal 11 is transmitted over the reverse channel. This is accomplished by means of a monopulser circuit 92 which is activated by the last stage of counter 69 to produce an output signal which inhibits gate 93 and also enables gate 94 for a period of one time slot of the reverse channel. The $\overline{2SC}$ signal is applied to the second input of gate 94 so that two consecutive pulses are transmitted over the reverse channel to effect synchronization.

Figure 4:
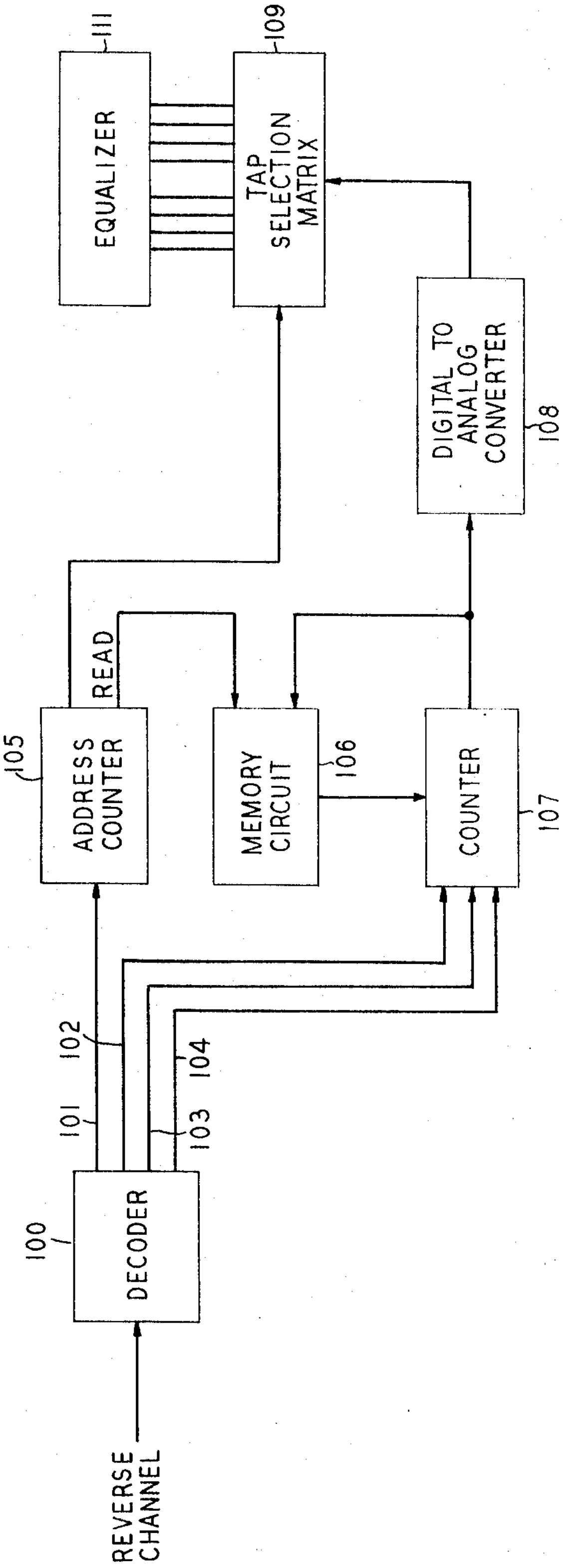
FIG. 4 is a block diagram of the memory and correction circuit 22 shown in FIG. 1.

At the transmitter the signals received over the reverse channel are employed to adjust the tap settings of the predistortion equalizer. The memory and correction apparatus 22 for such an equalizer is shown in FIG. 4 where the information received from the reverse channel is decoded by a decoder 100 which generates signals on output leads 101, 102, 103 and 104, indicating the receipt of synchronizing pulses, up information, down information and no change information respectively. The signal on output 101 is applied to an address counter which determines which of the locations in the preequalizer is being adjusted. A memory circuit 106 has stored therein the relative values of the settings for each location which are modified, if necessary, by the incoming signals in the reverse channel.

The address counter 105 generates a read signal each time a new location of the equalizer is to be adjusted. This causes the tap setting for that particular location to be transferred from circuit 106 to a counter 107. Counter 107 counts up or down or remains at the stored tap setting in accordance with the signals received on leads 102, 103 and 104 from decoder 100. The information in counter 107 is then applied to a digital to analog converter 108 and the resulting analog signal is applied to a tap selection matrix circuit 109 which operates under the control of address counter 105 to apply the output from circuit 109 to adjust the proper tap of equalizer 11. The output of counter 107 is also applied to memory circuit 106 so that the readjusted setting of the tap is stored in the memory circuit until its level is again reexamined in accordance with the differential signals with respect to that location reserved over the reverse channel.

Thus in accordance with this invention a digital equalizer is employed in a multilevel transmission system without the necessity of increasing the number of levels in encoding apparatus in the receiver.

It is to be understood that the above-described arrangements are illustrative of the operation of the invention. Numerous other arrangements may be devised by those skilled in the art without departing from the spirit and scope of the invention.

We claim:

1. A transmission system having a transmitter and a receiver comprising, in combination, a source of multilevel PCM signals, a transversal equalizer at said transmitter connected to receive said PCM signals and predistort them, vestigial sideband modulation apparatus at said transmitter connected to receive said predistorted signals, an analog band limited transmission medium connected to the output of said modulation apparatus, vestigial sideband demodulation apparatus connected to receive said transmitted signals, an encoder connected to the output of said demodulation apparatus to generate digital signals, control apparatus responsive to said digital signals generated by said encoder to generate equalizer correction signals, and a signaling path connected between said receiver and transmitter to apply said equalizer correction signals to said equalizer.

2. A transmission system having a transmitter and a receiver comprising, in combination, a source of multilevel PCM signals, an $n$ tap transversal equalizer at said transmitter connected to receive said PCM signals and predistort them, vestigial sideband modulation apparatus at said transmitter connected to receive said predistorted signals, an analog band-limited transmission medium connected to the output of said modulation apparatus, vestigial sideband demodulation apparatus connected to receive said transmitted signals, encoding apparatus connected to the output of said demodulation apparatus to generate digital output signals, polarity output signals, and error signals indicative of whether in reaching a level decision the encoding apparatus rounded the sample up or down, control apparatus responsive to said polarity and error signals to generate equalizer correction signals, a signaling path connected between said receiver and transmitter to transmit said equalizer correction signals back to said transmitter, memory and correction apparatus at said transmitter to store digital information representative of the setting of each of said $n$ taps of said transversal equalizer and responsive to said equalizer correction signals to change said stored digital information and change the setting of each tap.

3. Apparatus in accordance with claim 2 wherein said control apparatus responsive to said polarity and errors signals to generate equalizer correction signals comprises, a first shift register having $n$ stages, a first counter for establishing a predetermined time interval, a second shift register to which the error signals are applied, a second counter having $k$ stages where $k^2=n$, means responsive to the output of said first shift register and said second counter to enable an exclusive OR circuit connected to receive the output of said second shift register, a third counter connected to receive the output of said exclusive OR circuit for an interval determined by said first counter, and means connected to the output of said third counter to generate first, second and third predetermined signals when the count stored in said third counter is less than a first predetermined level, between a first and a second predetermined level, and greater than said second predetermined level respectively.

4. Apparatus in accordance with claim 2 wherein said memory and correction apparatus at the transmitter comprises in combination, a decoder to generate signals indicative of whether the equalizer control signals indicate that a particular equalizer tap setting is to be changed, memory apparatus to store information representative of the setting of each tap, a counter circuit responsive to the information stored in said memory apparatus and the output of said decoder to generate a digital signal representative of the proper setting of said particular tap, a digital to analog converter to convert said digital output of said counter to an analog signal, and a tap selection matrix responsive to said output of said analog to digital converter to adjust said particular tap of said equalizer.